(12) United States Patent
Yerram et al.

(10) Patent No.: US 10,697,637 B2
(45) Date of Patent: Jun. 30, 2020

(54) SYSTEM FOR OXIDANT INTAKE

(71) Applicant: General Electric Company, Schenectady, NY (US)

(72) Inventors: Ravinder Yerram, Sugar Land, TX (US); Balakrishnan Ponnuraj, Sugar Land, TX (US); Yalid Mariluz Lopez Moctezuma, Queretaro (MX); Donald Gordon Laing, Glasgow (GB); Gerardo Plata, Queretaro (MX); Timothy Martin Christensen, Baytown, TX (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 15/820,739

(22) Filed: Nov. 22, 2017

(65) Prior Publication Data
US 2019/0154261 A1    May 23, 2019

(51) Int. Cl.
| F23R 3/10 | (2006.01) |
| F02C 7/30 | (2006.01) |
| F01D 25/28 | (2006.01) |
| F02C 7/04 | (2006.01) |
| F23R 3/26 | (2006.01) |

(52) U.S. Cl.
CPC ........... *F23R 3/10* (2013.01); *F01D 25/28* (2013.01); *F02C 7/04* (2013.01); *F02C 7/30* (2013.01); *F23R 3/26* (2013.01); *F05D 2230/60* (2013.01); *F05D 2230/72* (2013.01)

(58) Field of Classification Search
CPC .... F02C 7/00; F02C 3/00; F04D 27/02; F05D 2230/60; F01D 25/28; F01D 25/00; B64D 33/02; B64D 2033/022; B60K 1/00; B23P 6/005; F23R 3/10; F23R 3/06; F23R 3/045
See application file for complete search history.

(56) References Cited

U.S. PATENT DOCUMENTS

| 6,279,309 | B1 | 8/2001 | Lawlor et al. |
| 7,770,292 | B2 | 8/2010 | Stretton |
| 7,849,878 | B2 | 12/2010 | Kohler et al. |
| 8,875,520 | B2 * | 11/2014 | Zeaton ...................... F02K 1/04 60/772 |
| 9,097,123 | B2 | 8/2015 | Holmes et al. |
| 9,845,730 | B2 * | 12/2017 | Betti ....................... F01D 25/34 |
| 2003/0014961 | A1 * | 1/2003 | Lawlor ..................... F01D 1/04 60/39.35 |
| 2005/0161275 | A1 | 7/2005 | Serrano et al. |

(Continued)

*Primary Examiner* — Lorne E Meade
(74) *Attorney, Agent, or Firm* — Fletcher Yoder, P.C.

(57) ABSTRACT

A gas turbine system includes a plenum that includes an inlet and an outlet. The inlet is configured to receive a flow of oxidant and the outlet is configured to direct the flow of oxidant in a downstream direction. Additionally, a support system is coupled to the plenum and to a cone. The support system enables the cone to move along the support system from a first position to a second position. The cone includes an upstream end and the upstream end is removably coupled to the outlet of the plenum in the first position. When the cone is in the first position, the cone is configured to direct the flow of oxidant in the downstream direction to a gas turbine engine. The upstream end is disposed upstream of the outlet and is decoupled from the outlet when the cone is in the second position.

20 Claims, 7 Drawing Sheets

(56) References Cited

U.S. PATENT DOCUMENTS

| | | |
|---|---|---|
| 2010/0095683 A1 | 4/2010 | Glynn et al. |
| 2013/0186435 A1 | 7/2013 | Saha et al. |
| 2014/0013768 A1 | 1/2014 | Laing et al. |
| 2015/0135727 A1 | 5/2015 | Chillar et al. |

\* cited by examiner

SYSTEM FOR OXIDANT INTAKE

BACKGROUND OF THE INVENTION

The subject matter disclosed herein relates to turbine systems. Specifically, the present disclosure relates to systems for an oxidant intake of a gas turbine system.

Turbine systems typically include an intake system that directs an oxidant, such as air, from an ambient environment (e.g., the atmosphere) towards a compressor of a gas turbine. However, the intake system may block access to components (e.g., compressor blades) of the compressor and hinder replacement of the compressor or the gas turbine. Unfortunately, the intake system may be large and substantially fixed, and is thus not easily removed or disassembled. Removal or disassembly of intake systems may increase costs and downtime associated with operation of the gas turbine systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas turbine system includes a plenum that includes an inlet and an outlet. The inlet is configured to receive a flow of oxidant and the outlet is configured to direct the flow of oxidant in a downstream direction. Additionally, a support system is coupled to the plenum and to a cone. The support system enables the cone to move along the support system from a first position to a second position. The cone includes an upstream end, and the upstream end is removably coupled to the outlet of the plenum in the first position. When the cone is in the first position, the cone is configured to direct the flow of oxidant in the downstream direction to a gas turbine engine. The upstream end is disposed upstream of the outlet and is decoupled from the outlet when the cone is in the second position.

In a second embodiment, an oxidant intake system includes a plenum with an inlet configured to receive a flow of oxidant. A screen is coupled to the inlet of the plenum. A support system is coupled to the plenum and to a cone. The cone is configured to move along an axis of the cone from a first position to a second position via the support system. The axis of the cone extends in a downstream direction. The plenum includes an outlet configured to direct the flow of oxidant in the downstream direction. The cone includes an upstream end and one or more water wash nozzles. The upstream end is removably coupled to the outlet of the plenum in the first position. The cone is configured to direct the flow of oxidant in the downstream direction to a gas turbine engine in the first position. The upstream end is disposed upstream of the outlet and is decoupled from the outlet in the second position.

In a third embodiment, a method for moving a cone of an oxidant intake system includes moving the cone along a support system between a first position and a second position relative to a plenum of an oxidant intake system. The support system is coupled to the plenum and to the cone. An upstream end of the cone is removably coupled to an outlet of the plenum in the first position. The cone is configured to direct a flow of oxidant in a downstream direction when the cone is in the first position. The upstream end of the cone is disposed upstream of the outlet and decoupled from the outlet in the second position.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
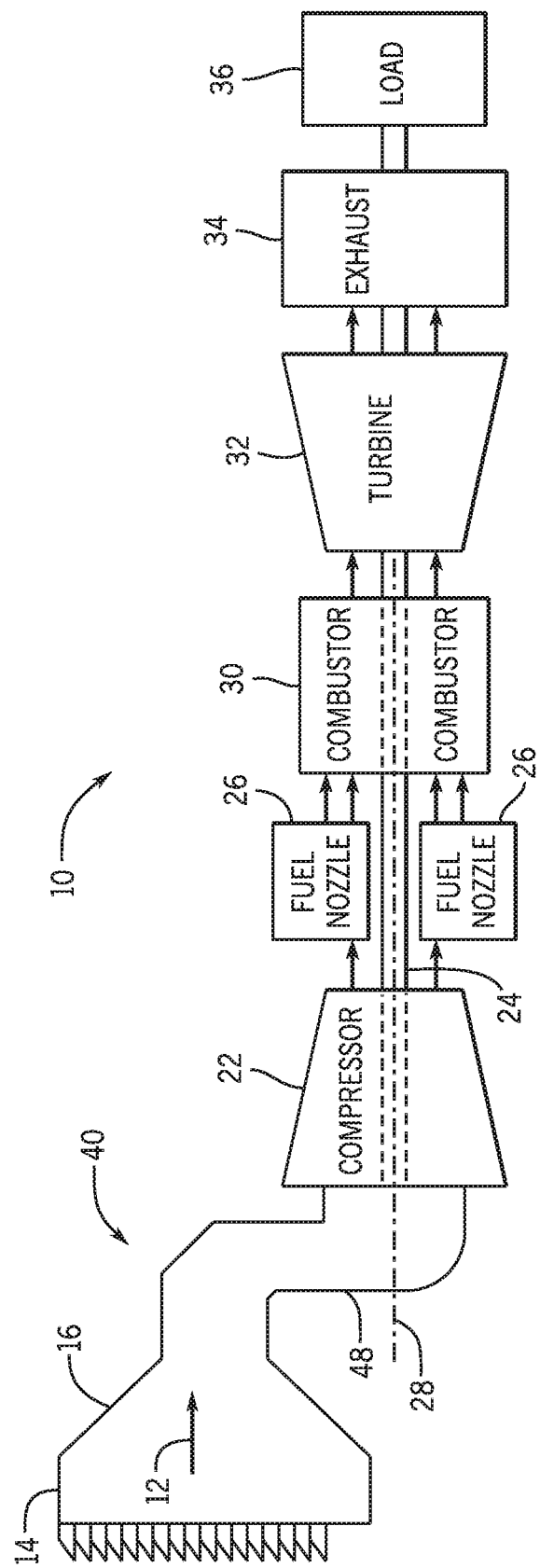
FIG. 1 is a block diagram of an embodiment of a gas turbine system including an oxidant intake system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are directed to turbine systems, and in particular, to systems and methods for operating a movable cone of an oxidant intake system of a gas turbine. Typical oxidant intake systems may be substantially fixed to a structure (e.g., a building housing the turbine system) or to the gas turbine. As such, it may be difficult for an operator (e.g., a maintenance technician) to access certain components of the gas turbine without disassembling or removing of a portion of the oxidant intake system from the turbine system. Furthermore, typical oxidant intake systems may not provide adequate space to enable replacement of the gas turbine without additionally removing the oxidant intake system, moving the whole oxidant intake system, or moving the whole gas turbine. Unfortunately, removing the whole oxidant intake system from the turbine system may be difficult or costly. Additionally, removal of the whole oxidant intake system renders the gas turbine system inoperable for a substantial period of time. In some cases, a water wash system including water wash nozzles may be coupled to a portion of the gas turbine or to the plenum of the oxidant intake system. As such, the water wash nozzles may increase the costs or complexity of replacement of the gas turbine.

In accordance with present embodiments, the oxidant intake system includes a cone that may be movable along an axis, which may enable the gas turbine to be inspected (e.g., by the maintenance technician) or replaced without removing the oxidant intake system. The cone may be disposed between a plenum and the gas turbine. The cone may be configured to move into the plenum (e.g., be disposed within a portion of the plenum) of the oxidant intake system, and thus create a gap (e.g., open space) between the plenum and the gas turbine. That is, the cone may retract into the plenum. The gap may be of a sufficient amount to enable inspection or removal of the gas turbine without removal of the oxidant intake system. In some cases, the cone may couple to a component of the gas turbine (e.g., a bellmouth) with quick-disconnect clamps. Additionally, the water wash system may be coupled to the cone such that nozzles of the water wash system may move (e.g., retract, extend) with the cone. The water wash system may therefore be reused when the gas turbine is replaced. As such, the time required to inspect the gas turbine, service the gas turbine, or replace the gas turbine with another gas turbine may be substantially reduced.

Now turning to the drawings, FIG. 1 is a block diagram of an embodiment of a gas turbine system 10. The present disclosure may relate to any turbomachine system and the gas turbine system 10 discussed herein does not limit the scope by which the present disclosure applies. A turbomachine system may relate to any system that involves the transfer of energy between a rotor and a fluid, or vice versa, and the illustrated gas turbine system 10 is meant to serve as a representation of an embodiment of a turbomachine system.

The gas turbine system 10 includes, a compressor 22, one or more turbine combustors 30, a turbine 32, and an oxidant intake system 40. An oxidant 12 may flow from outside of the gas turbine system 10 and into an inlet filter 14 connected to ductwork 16 of the oxidant intake system 40. The gas turbine system 10 draws the oxidant 12 through the ductwork 16 and then draws the oxidant 12 into the compressor 22 via a plenum 48. The compressor 22 compresses the oxidant 12, thereby increasing the pressure and temperature of the oxidant 12. The compressor 22 directs the oxidant 12 towards the one or more turbine combustors 30. In some embodiments, the compressor 22 directs the oxidant 12 to one or more fuel nozzles 26.

Each of the one or more turbine combustors 30 includes a fuel nozzle 26, which routes a liquid fuel and/or gas fuel, such as natural gas or syngas, into the respective turbine combustors 30. Each turbine combustor 30 may have multiple fuel nozzles 26. The one or more turbine combustors 30 ignite and combust an air-fuel mixture, and then direct hot pressurized combustion gases (e.g., exhaust) into the turbine 32. Turbine blades are coupled to a shaft 24, which may be coupled to several other components throughout the gas turbine system 10, including other shafts. The shaft 24 may extend along the length of the gas turbine system 10 and may coincide with an axial centerline 28 of the gas turbine system 10. Combustion gases expanding through the turbine blades in the turbine 32 drive the turbine 32 into rotation, thereby causing the shaft 24 to rotate. Eventually, the combustion gases exit the gas turbine system 10 via an exhaust outlet 34. Further, the shaft 24 may be coupled to a load 36, which is powered via rotation of the shaft 24. For example, the load 36 may be any suitable device that may generate power via the rotational output of the gas turbine system 10, such as a power generation plant or an external mechanical load. For instance, the load 36 may include an electrical generator, a propeller of an airplane, and so forth. Additionally, or in the alternative, the shaft 24 may drive the compressor 22.

Figure 2:
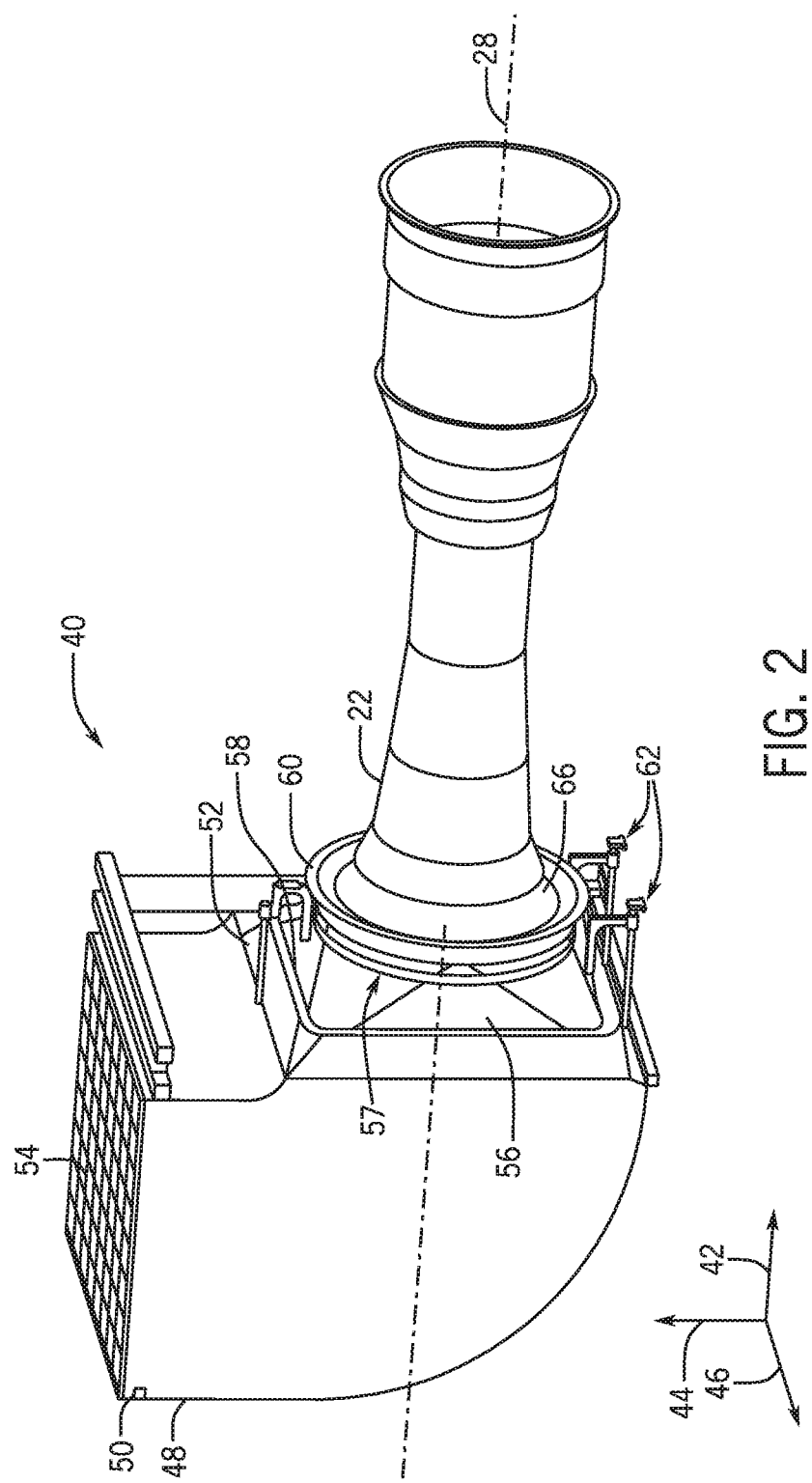
FIG. 2 is a perspective view of an embodiment of the oxidant intake system that may couple to a compressor of the gas turbine system of FIG. 1.

FIG. 2 is a perspective view of an embodiment of the oxidant intake system 40 that may couple to the compressor 22 of the gas turbine system 10. To facilitate discussion, the oxidant intake system 40 and its components may be described with reference to a longitudinal axis or downstream direction 42, a vertical axis or direction 44, and a lateral axis or direction 46. The longitudinal direction 42 may be parallel to the axial centerline 28 of the gas turbine system 10. The oxidant intake system 40 may be used in addition to, or in lieu of, the inlet filter 14 or the ductwork 16 described above. For example, the oxidant intake system 40 may be disposed between the inlet filter 14 and the compressor 22, or between the ductwork 16 and the compressor 22. In some embodiments, the oxidant intake system 40 may be used without the inlet filter 14 or the ductwork 16, such that the oxidant intake system 40 may directly draw the oxidant 12 from an ambient environment (e.g., the atmosphere).

The oxidant intake system 40 may include a plenum 48 (e.g., an inlet plenum) that includes an inlet 50 (e.g., an upstream end portion) and an outlet 52 (e.g., a downstream end portion). The oxidant 12 may flow from the inlet 50 of the plenum 48 towards the outlet 52 of the plenum 48. Although a cross-sectional shape of the inlet 50 and the outlet 52 are rectangular in the illustrated embodiment, the inlet 50 and the outlet 52 may include any cross-sectional shape, such as circular or oval. Additionally or otherwise, a cross-sectional shape of the inlet 50 may be different than a cross-sectional shape of the outlet 52.

The inlet 50 of the plenum 48 may be oriented along the vertical direction 44 (e.g., perpendicular to the axial centerline 28) and the outlet 52 of the plenum 48 may be oriented along the longitudinal direction 42 (e.g., parallel to the axial centerline 28). As such, the inlet 50 of the plenum 48 may be configured to receive a flow of the oxidant 12 in a first direction (e.g., the vertical direction 44) and may be configured to discharge the flow of oxidant 12 in a second direction (e.g., the longitudinal direction 42). In some embodiments, an orientation of one or both of the inlet 50 and the outlet 52 of the plenum 48 may be different than those described above. For example, the inlet 50 of the plenum 48 may be oriented along the longitudinal direction 42 and the outlet 52 of the plenum 48 may be oriented along the lateral direction 46.

The plenum 48 may include a screen 54 disposed near the upstream end portion of the plenum 48 (e.g., the inlet 50), the downstream end portion of the plenum 48 (e.g., the outlet 52), or both. The screen 54 may reduce a risk of foreign object damage (FOD) to the gas turbine system 10 due to particulates (e.g., sand, dust) or larger objects entering the oxidant intake system 40 and thus the gas turbine system 10. The screen 54, the inlet 50, and the outlet 52 may be configured to minimize a pressure drop between the ambient environment and compressor 22. For example, a cross sectional area of the screen 54, the inlet 50, and the outlet 52 may be large, such that the oxidant intake system 40 may direct a high volumetric flow rate of the oxidant 12 while the velocity of the flow of the oxidant 12 is low. Thus, frictional forces (e.g., shear) between the oxidant 12 and the screen 54, the inlet 50, or the outlet 52 may be kept low due to the low velocity. As such, a pressure differential between the ambient environment and the outlet 52 of the plenum 48 is low. As a non-limiting example, the pressure drop may be 3.5 pounds per square inch (psi).

The oxidant intake system 40 may include a cone 56 (e.g., an intake conduit or cone) that may be removably coupled to the outlet 52 of the plenum 48. The cone 56 may include an upstream end 58 (e.g., an inlet) and a downstream end 60 (e.g., an outlet). The cone 56 may include a water wash system 57 (shown in greater detail in FIG. 5) disposed near the upstream end 58, the downstream end 60, or both. As described in greater detail herein, the cone 56 may be configured to move along the longitudinal direction 42 (e.g., along the axial centerline 28 of the gas turbine system 10) via a support system 62, such that the cone 56 may move towards and into the outlet 52 of the plenum 48. For example, the cone 56 may be moved such that the upstream end 58 is disposed within or upstream of the outlet 52 of the plenum 48.

In some embodiments, the cone 56 may truncate conically from the upstream end 58 towards the downstream end 60. Additionally or otherwise, a cross-sectional shape of the cone 56 may change from the upstream end 58 towards the downstream end 60. As a non-limiting example, the upstream end 58 may include a rectangular cross-section and the downstream end 60 may include a circular cross-section. In some embodiments, a gasket may be disposed between the outlet 52 of the plenum 48 and the upstream end 58 of the cone 56. The gasket may reduce or eliminate fluid (e.g., the oxidant 12) from discharging between the outlet 52 of the plenum 48 and the upstream end 58 of the cone 56 when fluid is flowing through the oxidant intake system 40.

In some embodiments, the downstream end 60 of the cone 56 may be removably coupled to a bellmouth 66 (e.g., a conical flange) of the compressor 22. The bellmouth 66 may be disposed within a recess of the cone 56. In some embodiments, an inner diameter of the recess may be configured to accept an outer diameter of the bellmouth 66. As such, the recess may be used to align an axial centerline of the cone 56 and an axial centerline of the bellmouth 66 to the axial centerline 28 of the gas turbine system 10. A gasket may be disposed between the downstream end 60 (e.g., within the recess) of the cone 56 and the bellmouth 66 of the compressor 22. The gasket may reduce or eliminate fluid (e.g., the oxidant 12) from discharging between the downstream end 60 of the cone 56 and the bellmouth 66 of the compressor 22 when fluid is flowing through the oxidant intake system 40.

Figure 3:
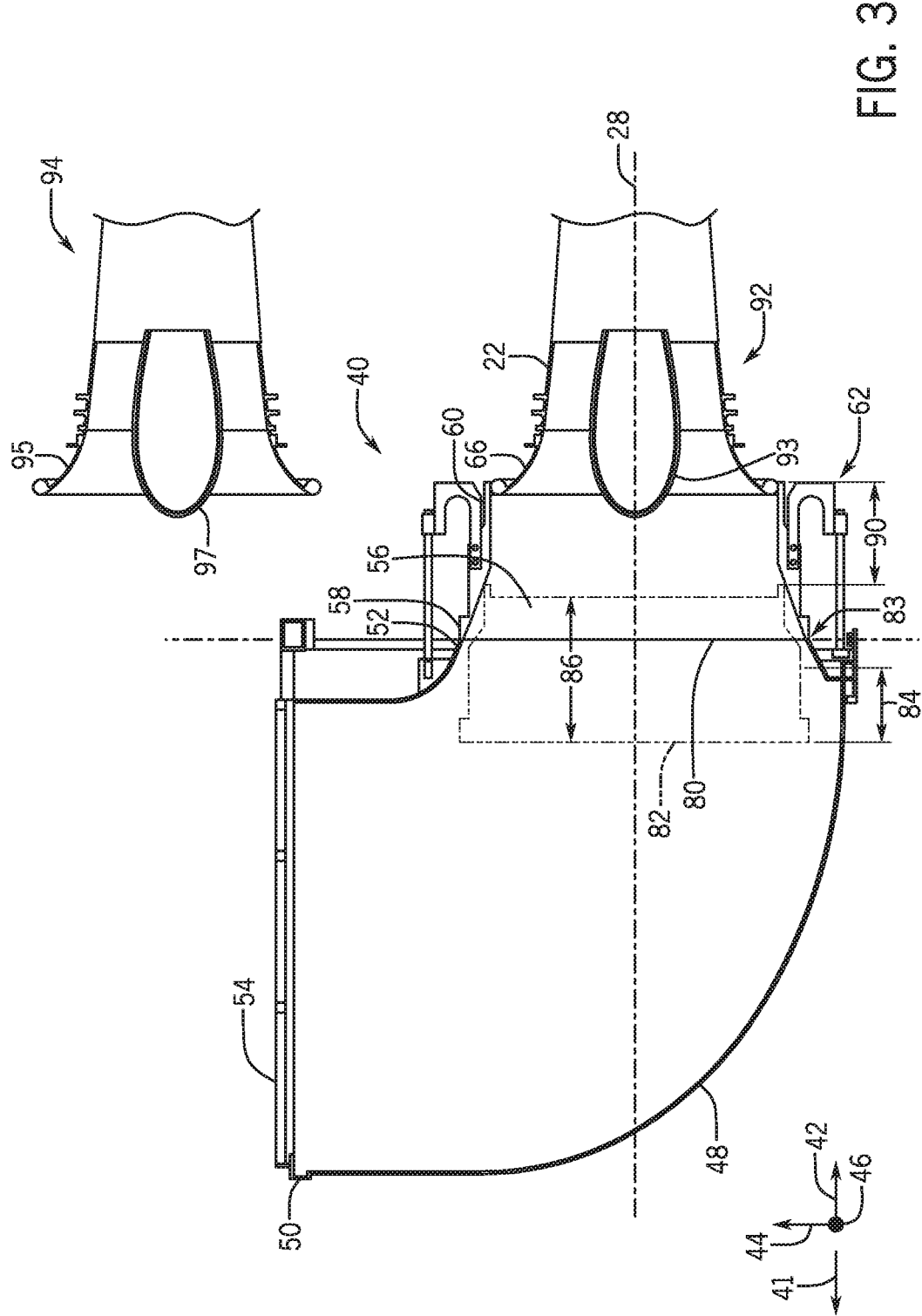
FIG. 3 is a side view of an embodiment of the oxidant intake system of FIG. 2, illustrating a cone that may be moved between a first position and a second position.

Turning now to FIG. 3, illustrating a side view of an embodiment of the oxidant intake system 40. As discussed above, the cone 56 may be configured to move along an axis, such as the axial centerline 28 of the gas turbine system 10. For example, the cone 56 may slide axially (e.g., parallel to the axial centerline 28) in an upstream direction 41 (e.g., into the outlet 52 of the plenum 48) or in the downstream direction 42 (e.g., towards the compressor 22) via the support system 62. As such, the cone 56 may be disposed in either a first position 80 (e.g., a downstream position) shown in FIG. 3 with solid lines, or a second position 82 (e.g., a upstream position) shown in FIG. 3 with phantom lines. The cone 56 may be configured to direct the oxidant 12 from the outlet 52 of the plenum 48 to the bellmouth 66 of the compressor 22 when the cone 56 is in the first position 80. As described in greater detail herein, the cone 56 may enable the operator (e.g., the maintenance technician) to perform maintenance work (e.g., inspect or service the blades of the compressor 22) when the cone 56 is in the second position 82.

In some embodiments, when the cone 56 is in the first position 80, the upstream end 58 may be coupled to the outlet 52 of the plenum 48 and the downstream end 60 may be coupled to the bellmouth 66 of the compressor 22. As such, the oxidant intake system 40 may direct the oxidant 12 from the ambient environment through the screen 54, the inlet 50 of the plenum 48, the outlet 52 of the plenum 48, the upstream end 58 of the cone 56, the downstream end 60 of the cone 56, and into the bellmouth 66 of the compressor 22. When the cone 56 is in the first position 80, the upstream end 58 may be coupled to the outlet 52 of the plenum 48 via fasteners (e.g., bolts, adhesive, removable clamps). Thus, the fasteners may be configured to impose a compressive force on a gasket 83 that may be disposed between the outlet 52 of the plenum 48 and the upstream end 58 of the cone 56. As such, the gasket 83 may form a seal that reduces or eliminates discharge of the oxidant 12 between the outlet 52 of the plenum 48 and the upstream end 58 of the cone 56. In some embodiments, the downstream end 60 of the cone 56 may be coupled to the bellmouth 66 of the compressor 22 via fasteners. The fasteners may be configured to impose a compressive force on the gasket that may be disposed between the downstream end 60 and the bellmouth 66. Thus, the gasket may form a seal that reduces or eliminates discharge of the oxidant 12 between the downstream end 60 and the bellmouth 66 of the compressor 22. As described in greater detail herein, in some embodiments, the downstream end 60 of the cone 56 may couple to the bellmouth 66 without fasteners.

It may be desirable to decouple the cone 56 from the outlet 52 of the plenum 48 and the bellmouth 66 of the compressor 22. As such, the support system 62 may be configured to move the cone 56 from the first position 80 to the second position 82. For example, the cone 56 is moved along the axial centerline 28 of the gas turbine system 10 from the downstream position (e.g., near the compressor 22) to the upstream position (e.g., near the plenum 48). When the cone 56 is in the second position 82, an upstream end portion 84 of the cone 56 may be disposed upstream of the outlet 52 of the plenum 48. In some embodiments, the upstream end portion 84 is a majority of a length 86 (e.g., a distance between the upstream end 58 and the downstream end 60) of the cone 56. The upstream end portion 84 may be between 1 to 85, 10 to 75, or 25 to 50 percent of the length 86 of the cone 56. As discussed in greater detail herein, the cone 56 may be held in the second position 82 by the support system 62.

When the cone 56 is moved to the second position 82, a gap 90 (e.g., a distance between the downstream end 60 of the cone 56 and the bellmouth 66 of the compressor 22) may be formed between the cone 56 and the bellmouth 66. In some embodiments, the gap 90 may enable the operator (e.g., the maintenance technician) to be positioned within the gap 90 and access components of the gas turbine system 10 (e.g., the compressor 22) to perform maintenance work (e.g., inspect or service blades of the compressor 22). As may be appreciated, increasing the upstream end portion 84 that may be moved upstream of the outlet 52 of the plenum 48 may increase the gap 90. The gap 90 may enable the operator to access the components without moving the plenum 48 or the gas turbine system 10.

In some embodiments, moving the cone 56 from the first position 80 to the second position 82 may enable a first gas turbine 92 to be replaced with a second gas turbine 94 without moving or partially disassembling the plenum 48. For example, the gap 90 may be suitable in length to enable a component (e.g., a nose cone 93) of the first gas turbine 92 and a component (e.g., a nose cone 97) of the second gas turbine 94 to avoid contact with the plenum 48 when replacing the gas turbines 92, 94, without moving the plenum 48. Additionally or otherwise, the gap 90 may enable moving equipment (e.g., a crane) to access or couple to the gas turbines 92, 94 without moving the plenum 48. As such, the first gas turbine 92 may be removed for maintenance and replaced with the second gas turbine 94 without disassembly of the oxidant intake system 40.

Before replacing the first gas turbine 92, the cone 56 is moved axially (e.g., in the upstream direction 41) along the support system 62 to form the gap 90. For example, the bellmouth 66 of the first gas turbine 92 decouples from the downstream end 60 of the cone 56. The upstream end 58 of the cone 56 decouples from the outlet 52 of the plenum 48. As such, the cone 56 is enabled to move axially along the support system 62 from the first position 80 to the second position 82. Thus, the first gas turbine 92 may be removed from the oxidant intake system 40. In some embodiments, after the first gas turbine 92 is removed, the second gas turbine 94 may be coupled to the oxidant intake system 40. For example, the cone 56 moves axially along the support system 62 (e.g., in the downstream 42 direction) from the second position 82 to the first position 80, such that the upstream end 58 of the cone 56 may recouple to the outlet 52 of the plenum 48 and the downstream end 60 of the cone 56 may couple to a second bellmouth 95 of the second gas turbine 94.

Figure 4:
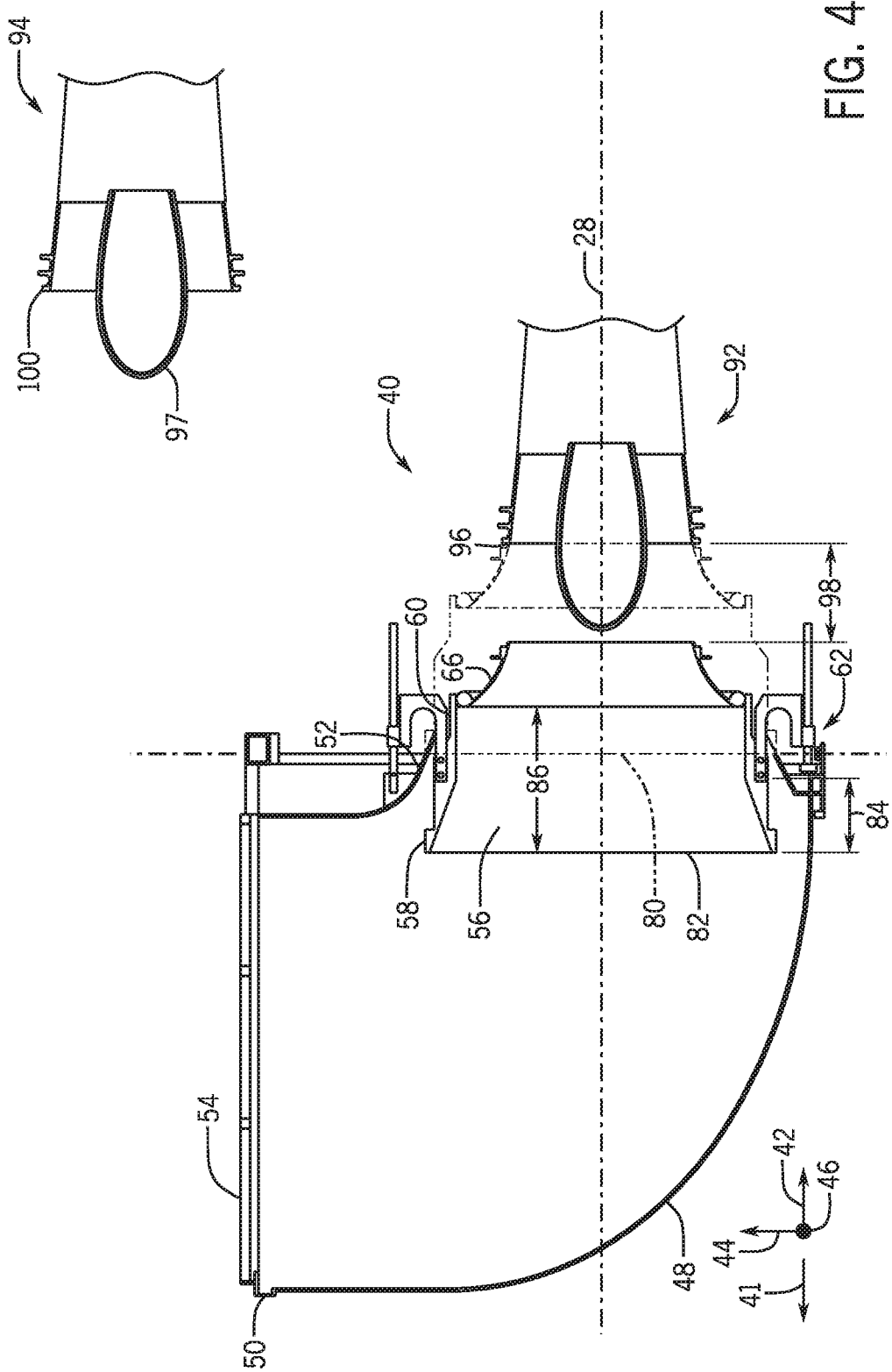
FIG. 4 is a side view of an embodiment of the oxidant intake system of FIG. 2, illustrating the cone and a bellmouth coupled thereto.

Turning now to FIG. 4, illustrating a side view of an embodiment of the oxidant intake system 40. As discussed above, the cone 56 may be configured to move along the axial centerline 28 of the gas turbine system 10 via the support system 62. In some embodiments, the bellmouth 66 of the compressor 22 may be configured to move with the cone 56. For example, the bellmouth 66 may decouple from an inlet 96 of the compressor 22 while remaining coupled to the downstream end 60 of the cone 56, such that the cone 56 and the bellmouth 66 may move along the support system 62 from the first position 80 to the second position 82, or from the second position 82 to the first position 80.

When the cone 56 and the bellmouth 66 are in the first position 80, the upstream end 58 of the cone 56 may be coupled to the outlet 52 of the plenum 48 and the bellmouth 66 may be coupled to the inlet 96 of the compressor 22. In some embodiments, it may be desirable to decouple the cone 56 from the outlet 52 of the plenum 48 and the bellmouth 66 from the compressor 22, such that the cone 56 and the bellmouth 66 may move from the first position 80 to the second position 82. The bellmouth 66 may be coupled to the inlet 96 of the compressor 22 via clamps (e.g., quick connect clamps) configured to quickly decouple the bellmouth 66 from the compressor 22. In some embodiments, the clamps may apply a compressive force between a flange of the bellmouth 66 and a flange of the compressor 22 (as shown in greater detail in FIG. 6), which may enable the clamps to couple the bellmouth 66 to the inlet 96 of the compressor 22 without other fasteners (e.g., bolts, adhesives).

When the cone 56 and the bellmouth 66 move to the second position 82 from the first position 80, a gap 98 (e.g., a distance between the bellmouth 66 and the inlet 96 of the compressor 22) may be formed between the bellmouth 66 and the inlet 96 of the compressor 22. As discussed above with the gap 90 of FIG. 3, the gap 98 may allow the operator (e.g., the maintenance technician) to be positioned within the gap 98 and gain access to the components of the gas turbine system 10 (e.g., the compressor 22) and perform maintenance work (e.g., inspect or service the blades of the compressor 22). As may be appreciated, increasing the upstream end portion 84 that may be moved upstream of the outlet 52 of the plenum 48 may increase the gap 98. As such, the gaps 90, 98 may enable the operator to access previously inaccessible components of the gas turbine system 10 without moving the plenum 48 or the gas turbine system 10.

In some embodiments, moving the cone 56 and bellmouth 66 from the first position 80 to the second position 82 may enable the first gas turbine 92 to be replaced with the second gas turbine 94. For example, the gap 98 created when moving the cone 56 and bellmouth 66 from the first position 80 to the second position 82 may be large enough to enable components (e.g., the nose cone 93) of the first gas turbine 92 and components (e.g., the nose cone 97) of the second gas turbine 94 to avoid contact with the plenum 48 when replacing the gas turbines 92, 94, without moving the plenum 48. Additionally or otherwise, the gap 98 may enable moving equipment (e.g., the crane) to access or couple to the gas turbines 92, 94 without moving the plenum 48. As such, the first gas turbine 92 may be removed for maintenance or replaced with the second gas turbine 94 without disassembly of the oxidant intake system 40.

Before replacing the first gas turbine 92, the cone 56 and the bellmouth 66 are moved axially (e.g., in the upstream direction 41) along the support system 62 to form the gap 98. For example, the bellmouth 66 of the first gas turbine 92 decouples from the compressor 22 of the first gas turbine 92. The upstream end 58 of the cone 56 decouples from the outlet 52 of the plenum 48. The cone 56 and the bellmouth 66 of the first gas turbine 92 are enabled to move axially along the support system 62 from the first position 80 to the second position 82, such that the upstream end portion 84 of the cone 56 is disposed upstream of the outlet 52 of the plenum 48. Thus, the first gas turbine 92 may be removed from the oxidant intake system 40. In some embodiments, after the first gas turbine 92 is removed, the second gas turbine 94 may be coupled to the oxidant intake system 40. For example, the cone 56 and the bellmouth 66 of the first gas turbine 92 move axially along the support system (e.g., in the downstream direction 42) from the second position 82 to the first position 80, such that the upstream end 58 of the cone 56 may recouple to the outlet 52 of the plenum 48 and the bellmouth 66 of the first gas turbine 92 may couple to an inlet 100 of the second gas turbine 94.

Figure 5:
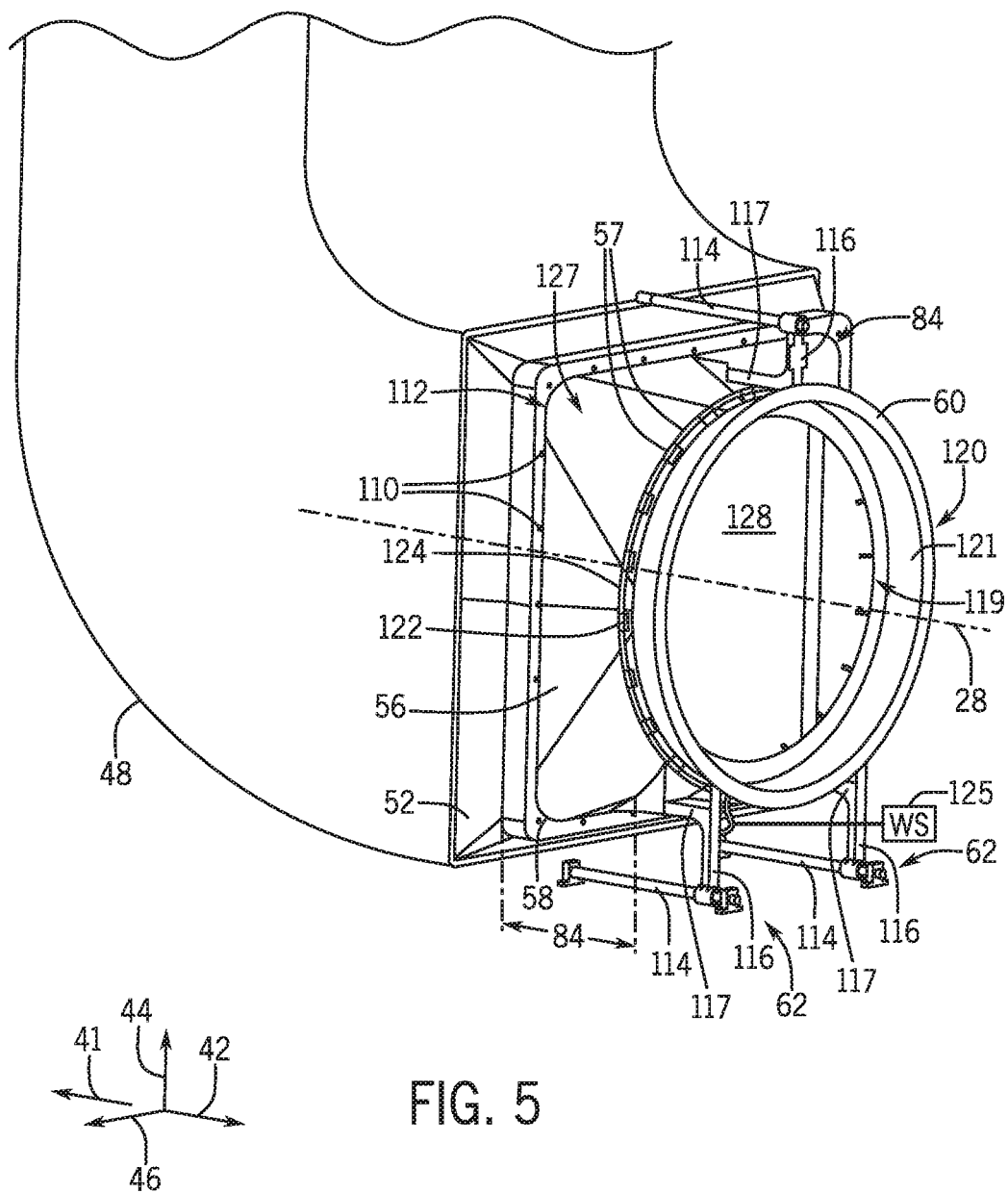
FIG. 5 is a perspective view of the cone with a water wash system.

Turning now to FIG. 5, illustrating an expanded perspective view of an embodiment of the outlet 52 of the plenum 48 and the cone 56. In the illustrated embodiment, the cone 56 is shown in the first position 80. As discussed previously, the upstream end 58 of the cone 56 may be coupled to the outlet 52 of the plenum 48 via fasteners 110 (e.g., bolts, adhesives, clamps) when the cone 56 is in the first position 80. A gasket may be disposed between a mating surface 112 (e.g., a flange) of the outlet 52 of the plenum 48 and the upstream end 58 of the cone 56.

The support system 62 may enable the cone 56 to move along the axial centerline 28 of the gas turbine system 10. In some embodiments, the support system 62 may include one or more guide rails 114 (e.g., rods, slotted tracks) that may couple to the plenum 48 and extend from the plenum 48 in the longitudinal direction 42 (e.g., in the downstream direction). The guide rails 114 may be fixed or removably coupled to the plenum 48. Each guide rail 114 may be movably coupled to a guide bracket 116. The guide brackets 116 may couple to the cone 56 via fasteners. In some embodiments, the guide brackets 116 may couple to the upstream end portion 84 of the cone 56. Additionally or otherwise, the guide brackets 116 may couple to any portion of the cone 56. In some embodiments, the guide rails 114 may enable the guide brackets 116 to slide (e.g., move in the longitudinal direction 42) along the guide rails 114 while restricting movement of the guide brackets 116 in the vertical direction 44 and the lateral direction 46. As such, the guide rails 114 and the guide brackets 116 of the support system 62 may enable the cone 56 to move (e.g., extend, retract) along the axial centerline 28 of the gas turbine system 10 (e.g., from the first position 80 to the second position 82) while restricting movement of the cone 56 in the vertical direction 44 and the lateral direction 46.

In some embodiments, the guide brackets 116 may partially move upstream of the outlet 52 of the plenum 48 when the cone 56 is in the second position 82. For example, a portion (e.g., a lower mounting leg 117) of the guide brackets 116 may be disposed within the outlet 52 of the plenum when the cone 56 is moved from the first position 80 to the second position 82. Thus, the support system 62 may enable a majority (e.g., 50 percent, 75 percent, or more) of the length 86 of the cone 56 to be disposed upstream of the outlet 52 of the plenum 48 when the cone 56 is in the second position 82.

In some embodiments, the bellmouth 66 of the compressor 22 may couple to the cone 56 via one or more fasteners. In other embodiments, the support system 62 may enable the bellmouth 66 to couple to or interface with the downstream end 60 of the cone 56 without fasteners. As discussed previously, the bellmouth 66 may be disposed within a recess 121 of the cone 56. A gasket may be disposed on a flange 119 within the recess 121 of the cone 56. In some embodiments, the support system 62 may be configured to apply a compressive force to the flange 119, the gasket, and the bellmouth 66 when the cone 56 is in the first position 80. For example, the cone 56 may move towards the bellmouth 66 (e.g., in the downstream direction 42) to axially compress the gasket between the flange 119 and the bellmouth 66. Thus, the gasket may form a seal that reduces or eliminates discharge of the oxidant 12 between the downstream end 60 of the cone 56 and the bellmouth 66 of the compressor 22.

In some embodiments, the water wash system 57 may be coupled to the cone 56 and configured to move with the cone 56 between the first position 80 and the second position 82. The water wash system 57 may be coupled to the cone 56 near a downstream end portion 120 of the cone 56 or near the upstream end portion 84 of the cone 56. The water wash system 57 may include one or more water wash nozzles 122 that may be in fluid communication with one or more manifolds 124 at different axial positions along the cone 56. As such, the one or more manifolds 124 may be configured to supply a fluid (e.g., water, steam) from a fluid source 125 (e.g., a water supply, a steam supply) to the water wash nozzles 122.

The one or more manifolds 124 and the water wash nozzles 122 may be disposed about a perimeter of an exterior surface 127 of the cone 56. In some embodiments, the one or more manifolds 124 may be disposed about only a portion of the perimeter of the exterior surface 127 (e.g., half of the perimeter of the exterior surface 127). As described in greater detail herein, the water wash nozzles 122 may radially extend from the one or more manifolds 124 and through openings within the cone 56 toward the axial centerline 28, such that a portion of the water wash nozzles 122 (e.g., nozzle tips 126) may extend into an interior region 128 of the cone 56. The interior region 128 may include a portion of the flow path of the oxidant 12. The water wash nozzles 122 may supply the fluid (e.g., water, steam) into the flow path of the oxidant 12, thereby enabling blades of the compressor 22 of the gas turbine system 10 to be washed.

Figure 6:
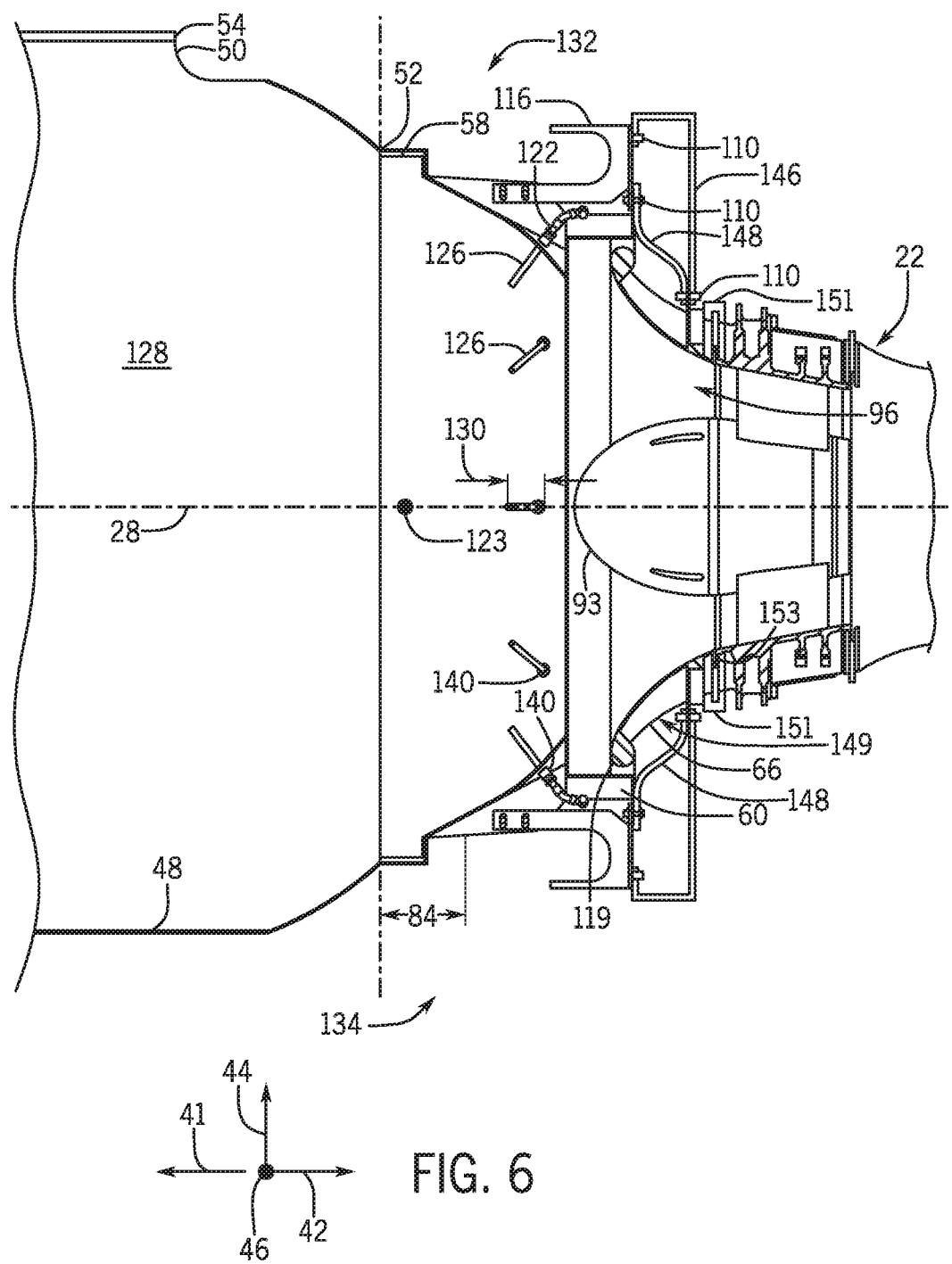
FIG. 6 is a cross-sectional view of the cone of FIG. 5.

FIG. 6 illustrates a cross-sectional view of an embodiment of the cone 56. The water wash nozzles 122 may extend through the cone 56 into the interior region 128 through openings 140. The openings 140 may be disposed equidistantly about the perimeter of the cone 56, or in any suitable configuration to supply a desired fluid flow for the compressor 22. A seal (e.g., rubber gasket, silicone) may be disposed between the openings 140 and the water wash nozzles 122. The seal may block the oxidant 12 from discharging from the interior region 128 into the ambient environment through the openings 140.

The water wash system 57 may include any quantity of water wash nozzles 122 that extend into the interior region 128 of the cone 56. For example, the water wash system 57 may include 2, 3, 4, 5, 6, 7, 8, 9, or more water wash nozzles 122. The water wash nozzles 122 may have a length 130, which may be the length 130 of extension of the water wash nozzles 122 into the flow path of the oxidant 12. In some embodiments, the length 130 of the water wash nozzles 122 may be fifteen centimeters. However, the water wash nozzles 122 may be any length 130, such as 1, 2, 3, 4, 5, 10, 15, 20, 25, or more centimeters. The length 130 of each of the water wash nozzles 122 may be the same. In some embodiments, the lengths 130 of certain water wash nozzles 122 may be different than the lengths 130 of other water wash nozzles 122. For example, the lengths 130 of water wash nozzles 122 disposed near an upper portion 132 of the cone 56 may be different than the length 130 of water wash nozzles 122 disposed near a lower portion 134 of the cone 56.

In some embodiments, each water wash nozzle 122 may extend in a direction that is perpendicular to the axial centerline 28 of the gas turbine system 10. For example, the direction in which each water wash nozzle 122 extends may be coplanar to a plane along the vertical direction 44 and the lateral direction 46. Thus, each water wash nozzle 122 points toward the axial centerline 28. In some embodiments, each water wash nozzle 122 may be positioned to extend at an angle relative to the plane in the upstream direction 41, or at an angle relative to the plane in the downstream direction 42. For example, the water wash nozzles 122 may be directed towards a point 123 along the axial centerline 28. In some embodiments, each of the water wash nozzles 122 may be directed toward different points along the axial centerline 28 of the gas turbine system 10.

The nozzle tips 126 of the water wash nozzles 122 may emit a fluid spray (e.g., fluid droplets) as the oxidant 12 is directed through the cone 56 and past the water wash nozzles 122. The fluid droplets are thus directed into the flow path of the oxidant 12. The fluid droplets from the water wash nozzles 122 mix with the oxidant 12 and are directed into the compressor 22. As the oxidant 12 and the fluid droplets flow into the compressor 22, the droplets may interface with components of the compressor 22 (e.g., compressor blades, the nose cone 97).

In some embodiments, the water wash system 57 disposed about the cone 56 may facilitate directing a desired spray pattern of fluid into the compressor 22 of the gas turbine system 10. For example, coupling the water wash system 57 to the cone 56 may enable the water wash nozzles 122 to be disposed nearer the inlet 96 of the compressor 22 than if the water wash nozzles 122 were disposed at the inlet 50 of the plenum 48. The water wash system 57 may enable the spray pattern of the fluid to be regulated via various parameters (e.g., pressure, flowrate). In some embodiments, the water wash system 57 may eject fluid through all of the water wash nozzles 122 coupled to the one or more manifolds 124 or only a subset of the water wash nozzles 122 (e.g., via solenoid valves disposed within each water wash nozzle 122).

The configuration of the water wash system 57 may mitigate a risk of foreign object damage due to components separating from the water wash system 57 and entering the gas turbine system 10. For example, in some embodiments, only the nozzle tips 126 of the water wash nozzles 122 may extend through the cone 56 and into the interior region 128, while the remaining components of the water wash system 57 (e.g., the one or more manifolds 124) are disposed about the exterior surface 127 of the cone 56. As such, a risk of components entering the gas turbine system 10 may be reduced. Thus, the screen 54 may be disposed upstream of the water wash system 57, due to the reduced risk of components separating from the water wash system 57 and entering the gas turbine system 10.

In some embodiments, the bellmouth 66 may couple to the cone 56 via a mounting bracket 146. The mounting bracket 146 may couple directly to the cone 56 or to a component of the support system 62 (e.g., such as the guide bracket 116). The mounting bracket 146 may couple the bellmouth 66 to the cone 56 via fasteners 110. The mounting bracket 146 may be configured to restrict movement between the bellmouth 66 and the cone 56. Additionally or otherwise, the mounting bracket 146 may be configured to transmit a compressive force, such that a gasket between the flange 119 of the cone 56 and the bellmouth 66 may form a fluidic seal that reduces or eliminates fluid (e.g., the oxidant 12) from undesirably discharging between the downstream end 60 of the cone 56 and the bellmouth 66.

A gasket 148 may be used in addition to, or in lieu of, the gasket between the flange 119 and the bellmouth 66. The gasket 148 may be annular in shape and be disposed about the bellmouth 66 of compressor 22. As such, the gasket 148 may extend between an exterior surface 149 of the bellmouth 66 and the downstream end 60 of the cone 56. The gasket 148 may thus prevent an undesirable discharge of fluid (e.g., the oxidant 12) between the downstream end 60 of the cone 56 and the bellmouth 66.

In some embodiments, the bellmouth 66 may be coupled to the compressor 22 (e.g., the inlet 96 of the compressor 22) via a clamp 151. The clamp 151 may be configured to couple a flanged connection area 153 between the bellmouth 66 and the compressor 22. In some embodiments, the clamp 151 may not utilize fasteners to couple the flanged connection area 153 (e.g., the clamp 151 may be a snap-ring style clamp). As such, the clamp 151 may enable the bellmouth 66 to be removed quickly when, for example, moving the cone 56 from the first position 80 to the second position 82 or when replacing the first gas turbine 92 with the second gas turbine 94.

Figure 7:
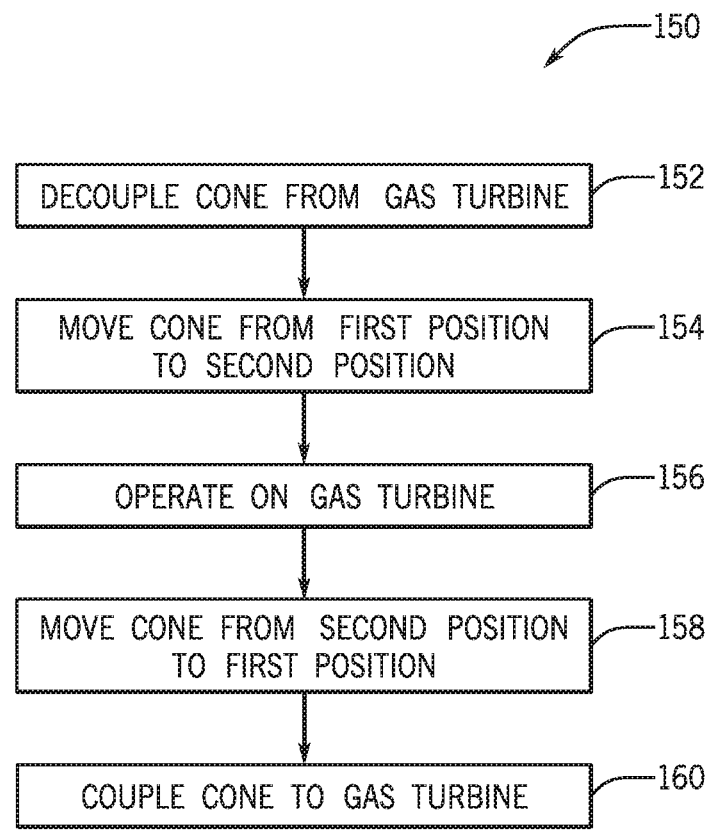
FIG. 7 is a method of operating the oxidant intake system of FIG. 2 with the gas turbine system.

Turning now to FIG. 7, illustrating an embodiment of a method 150 that may be used to move the cone 56 of the oxidant intake system 40 from the first position 80 to the second position 82. An operator (e.g., the service technician) may decouple (block 152) a gas turbine (e.g., the first gas turbine 92) from the downstream end 60 of the cone 56. In some embodiments, the mounting bracket 146 and the gasket 148 may decouple from the bellmouth 66 of the first gas turbine 92, such that the cone 56 may be moved independently of the bellmouth 66. In other embodiments, the mounting bracket 146 and gasket 148 may instead decouple from the cone 56, such that the mounting bracket 146 and the gasket 148 remain stationary with the bellmouth 66. In further embodiments, the bellmouth 66 may be disposed within the recess 121 and may not couple to the cone 56 via any fasteners (e.g., without the mounting bracket 146). In any case, the operator decouples the cone 56 from the first gas turbine 92 which enables the cone 56 to move relative to the first gas turbine 92.

In some embodiments, the bellmouth 66 may remain coupled to the downstream end 60 of the cone 56 while the operator instead decouples the bellmouth 66 from the compressor 22 of the first gas turbine 92. The clamp 151 may enable the bellmouth 66 to decouple from the compressor 22 at the flanged connection area 153. As such, the cone 56 and bellmouth 66, together, may decouple from the first gas turbine 92. Thus, in some embodiments, the mounting bracket 146 and the gasket 148 may remain coupled to the cone 56 and the bellmouth 66, while the cone 56 and the bellmouth 66 are configured to move (e.g., in the upstream direction 41) along the support system 62 as an assembly.

After the cone 56 is decoupled from the first gas turbine 92, the cone 56 is moved (block 154) from the first position 80 to the second position 82. The cone 56 may be moved axially (e.g., along the axial centerline 28) towards the outlet 52 of the plenum 48 (e.g., in the upstream direction 41) via the support system 62. As such, the upstream end portion 84 of the cone 56, may be disposed upstream of the outlet 52 of the plenum 48. The lower mounting leg 117 of the guide bracket 116 may be disposed within the outlet 52 of the plenum 48. In some embodiments, the upstream end portion 84 of the cone 56 may include 50 percent of the length 86 of the cone 56, 75 percent of the length 86 of the cone 56, or more.

The operator may operate on (block 156) on the first gas turbine 92 to inspect or service components of the first gas turbine 92 (e.g., the blades within the compressor 22) when the cone 56 has moved to the second position 82. Additionally or otherwise, the first gas turbine 92 may be replaced with the second gas turbine 94. In some embodiments, the first gas turbine 92 and the bellmouth 66 of the first gas turbine 92 may be removed from the oxidant intake system 40 as a unit and replaced with the second gas turbine 94 including the second bellmouth 95. In other embodiments, only the first gas turbine 92 may be removed (e.g., while the bellmouth 66 of the first gas turbine 92 remains coupled to the downstream end 60 of the cone 56). As such, the inlet 100 of the second gas turbine 94 may couple to the bellmouth 66 of the first gas turbine 92. Thus, the first gas turbine 92 may be replaced with the second gas turbine 94 without removing or disassembling the oxidant intake system 40.

After operating on the first gas turbine 92 or replacing the first gas turbine 92, the operator moves (block 158) the cone 56 from the second position 82 to the first position 80. The operator may then couple (block 160) the cone 56 to the first gas turbine 92 or the second gas turbine 94. For example, when the cone 56 is returned to the first position 80, the downstream end 60 of the cone 56 may recouple to the bellmouth 66 of the first gas turbine 92. In some embodiments, the bellmouth 66 of the first gas turbine 92 may recouple to the compressor 22 of the first gas turbine 92. In other embodiments, the downstream end 60 of the cone 56 may couple to the bellmouth 95 of the second gas turbine 94. In still other embodiments, the bellmouth 66 of the first gas turbine 92 may couple to the inlet 100 of the second gas turbine 94. When suitable, the mounting bracket 146 and the gasket 148 may recouple between the downstream end 60 of the cone 56 and the bellmouths 66 or 95 of the first gas turbine 92 or the second gas turbine 94, respectively. Additionally or otherwise, the clamp 151 may recouple the flanged connection area 153 between the bellmouths 66, 95 and the first gas turbine 92 or the second gas turbine 94.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A gas turbine system comprising:
a plenum comprising a first passage extending from an inlet configured to receive a flow of oxidant and an outlet configured to direct the flow of oxidant in a downstream direction;
an intake conduit comprising a second passage fluidly coupled to the first passage, wherein the second passage decreases in cross-sectional area in the downstream direction; and
a support system coupled to the plenum and to the intake conduit, wherein the intake conduit is configured to move in an axial direction along the support system between first and second positions, the intake conduit is extended outwardly from the plenum in the downstream direction and fluidly couples with an intake of a compressor of a gas turbine engine in the first position, and the intake conduit is retracted inwardly into the plenum in an upstream direction and is axially spaced apart from the intake of the compressor in the second position.

2. The gas turbine system of claim 1, wherein the support system comprises a plurality of guide rails and a plurality of guide brackets, wherein each guide rail of the plurality of guide rails is coupled to the plenum and extends in the downstream direction, each guide bracket of the plurality of guide brackets is coupled to a downstream portion of the intake conduit, and each guide bracket of the plurality of guide brackets is configured to move along a respective guide rail of the plurality of guide rails when the intake conduit moves from the first position to the second position.

3. The gas turbine system of claim 2, wherein each guide bracket of the plurality of guide brackets extends inwardly into the plenum when the intake conduit is moved from the first position to the second position.

4. The gas turbine system of claim 1, wherein an upstream portion of the intake conduit is disposed upstream of the outlet when the intake conduit is in the second position, and the upstream portion comprises at least 50 percent of a length of the intake conduit extending in the downstream direction.

5. The gas turbine system of claim 4, wherein one or more water wash nozzles are disposed on the upstream portion of the intake conduit.

6. The gas turbine system of claim 5, wherein the one or more water wash nozzles are fluidly coupled to a manifold disposed at least partially around the intake conduit.

7. The gas turbine system of claim 1, wherein the intake conduit comprises a cone.

8. The gas turbine system of claim 1, wherein the support system comprises at least first and second guides disposed on opposite sides of the intake conduit, wherein the first and second guides are configured to guide movement of the intake conduit in the axial direction between the first and second positions, and at least one of the first or second guides is disposed at a height offset from a ground level.

9. The gas turbine system of claim 1, comprising the gas turbine engine having the intake of the compressor coupled to the intake conduit in the first position.

10. The gas turbine system of claim 1, wherein the intake conduit is configured to move in the axial direction along the support system between the first and second positions while the plenum and the gas turbine engine remain stationary.

11. A system comprising:
an oxidant intake system comprising:
a plenum comprising a first passage having an inlet configured to receive a flow of oxidant and an outlet configured to direct the flow of oxidant in a downstream direction;
an intake conduit comprising a second passage fluidly coupled to the first passage; and
a support system coupled to the plenum and to the intake conduit, wherein the intake conduit is configured to move along the support system between first and second positions, the intake conduit is extended outwardly from the plenum in the downstream direction and fluidly couples with an intake of a compressor of a gas turbine engine in the first position, and the intake conduit is retracted inwardly into the plenum in an upstream direction and is axially spaced apart from the intake of the compressor in the second position.

12. The system of claim 11, wherein an upstream portion of the intake conduit is disposed upstream of the outlet when the intake conduit is in the second position, and the upstream portion comprises at least 75 percent of a length of the intake conduit extending in the downstream direction.

13. The system of claim 11, comprising one or more water wash nozzles coupled to the intake conduit, wherein the one or more water wash nozzles are disposed upstream of the outlet when the intake conduit is in the second position.

14. The system of claim 11, comprising the gas turbine engine coupled to the oxidant intake system, wherein the gas turbine engine comprises a bellmouth, the bellmouth is coupled to a downstream end of the intake conduit, the bellmouth is removably coupled to the intake of the compressor in the first position, and the bellmouth is decoupled from the intake of the compressor when the intake conduit is in the second position.

15. A method comprising:
moving an intake conduit of an oxidant intake system along a support system between a first position and a second position relative to a plenum of the oxidant intake system, wherein the plenum comprises a first passage and the intake conduit comprises a second passage, the support system is coupled to the plenum and to the intake conduit, the intake conduit is extended outwardly from the plenum in a downstream direction and fluidly couples with an intake of a compressor of a gas turbine engine in the first position, and the intake conduit is retracted inwardly into the plenum in an upstream direction and is axially spaced apart from the intake of the compressor in the second position.

16. The method of claim 15, comprising:
coupling the intake conduit to a bellmouth of the intake of the compressor when the intake conduit is in the first position.

17. The method of claim 15, wherein moving comprises moving the intake conduit between the first and second positions while the plenum and the gas turbine engine remain stationary.

18. The method of claim 17, wherein moving the intake conduit comprises moving a bellmouth coupled to the intake conduit between the first and second positions, wherein the bellmouth is fluidly coupled to the intake of the compressor in the first position of the intake conduit, and the bellmouth is axially spaced apart from the intake of the compressor in the second position of the intake conduit.

19. The method of claim 15, wherein when the intake conduit is disposed in the second position, an upstream portion of the intake conduit is disposed upstream of an outlet of the plenum, and the upstream portion comprises at least 50 percent of a length of the intake conduit extending in the downstream direction.

20. The method of claim 15, comprising fluidly coupling a water supply to a manifold disposed at least partially around the intake conduit when the intake conduit is in the first position, wherein the intake conduit comprises a plurality of water wash nozzles disposed on an upstream portion of the intake conduit that is disposed upstream of an outlet of the plenum when the intake conduit is in the second position, and the plurality of water wash nozzles are coupled to the manifold.

* * * * *